United States Patent [19]

Kimberlin et al.

[11] Patent Number: 4,983,152
[45] Date of Patent: Jan. 8, 1991

[54] PLANET GEAR FRAME ASSEMBLY

[75] Inventors: Robert R. Kimberlin, Athens; Robert E. Geiger, Sayre; Frank Speck, Wayne Allis, both of Athens, all of Pa.

[73] Assignees: Ingersoll-Rand Company, Woodcliff Lake, N.J.

[21] Appl. No.: 404,614

[22] Filed: Sep. 8, 1989

[51] Int. Cl.$^5$ ............................................. F16H 3/44
[52] U.S. Cl. ..................................... 475/331; 475/348
[58] Field of Search ............... 475/331, 334, 346, 348; 74/325

[56] References Cited

U.S. PATENT DOCUMENTS

| 3,071,986 | 1/1963 | Schwerdhöfer | 475/331 |
| 3,293,948 | 12/1966 | Jarchow et al. | 475/348 X |
| 3,939,736 | 2/1976 | Morin | 475/331 X |
| 4,222,290 | 9/1980 | Helmer et al. | 475/331 X |
| 4,480,492 | 11/1984 | Fujioka et al. | 475/348 X |
| 4,617,839 | 10/1986 | Matoda | 475/331 X |
| 4,756,212 | 7/1988 | Fuehrer | 475/331 X |

Primary Examiner—Rodney H. Bonck
Assistant Examiner—Benjamin Levi
Attorney, Agent, or Firm—Robert F. Palermo

[57] ABSTRACT

The assembly is so configured as to use common parts, whereby another assembly, having a different gear ratio, can be formed using the selfsame common parts. Only different gears, and a different frame is required to form the alternative assembly having the other gear ratio. Accordingly, stocking of discrete parts for the differing assemblies is greatly reduced.

1 Claim, 1 Drawing Sheet

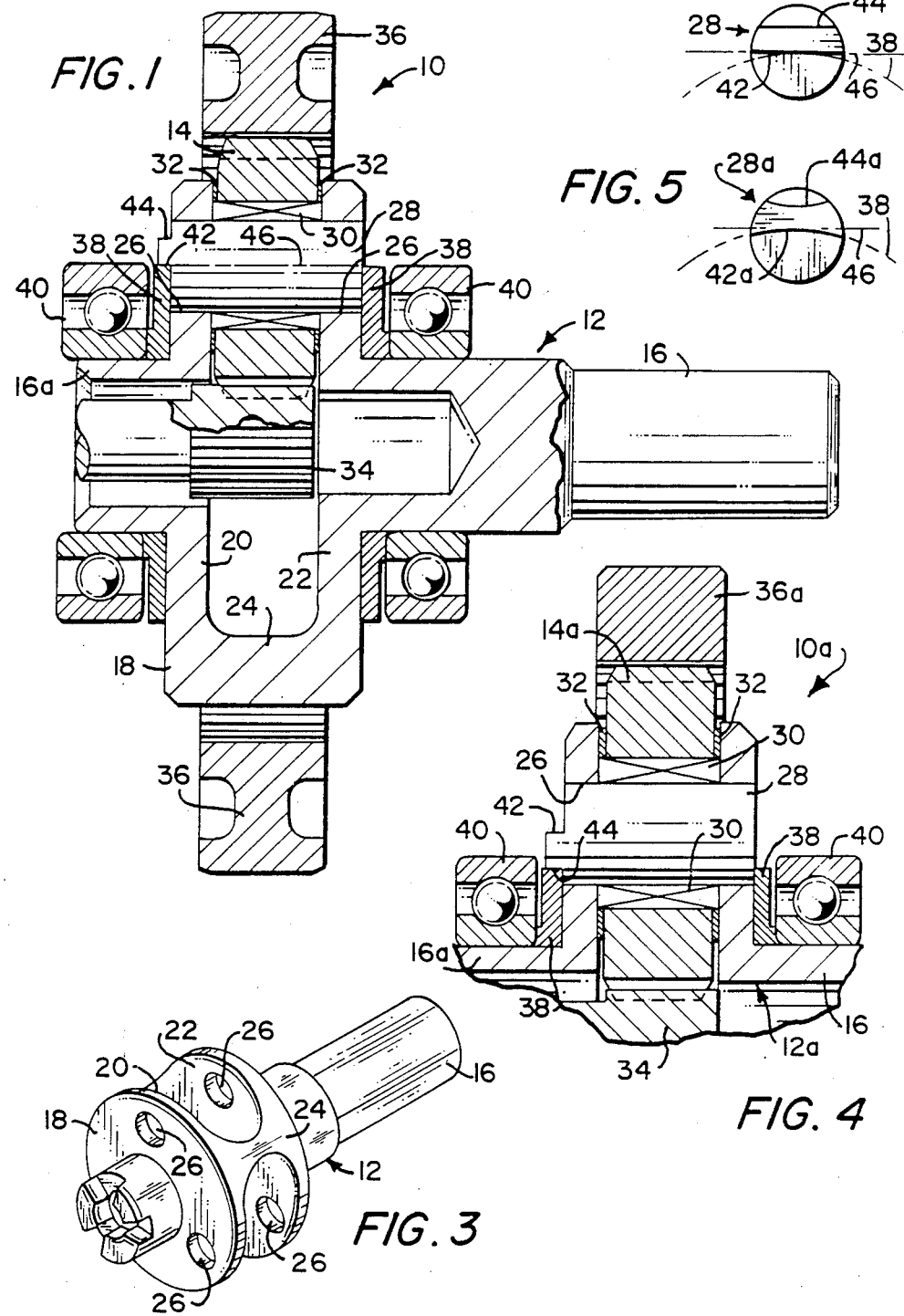

PLANET GEAR FRAME ASSEMBLY

This invention pertains to assemblies of gears, and in particular to planet gear frame assemblies.

Commonly, planet gear frame assemblies of given gear ratios are discrete assemblies. Each assembly has a prescribed frame, prescribed planet gears, and accommodating gear-mounting pins, bearings, retainers, sungear and the like. Accordingly, it is expensive for a manufacturer to have to stock the several discrete parts and components for each of the differing planet gear frame assemblies, for the varying gear ratios desired by customers.

It is an object of this invention to set forth a planet gear frame assembly which, by providing parts which can be used in several assemblies, minimizes the number of differing components and parts required to be stocked to meet the requirements for such assemblies of varying gear ratios.

Particularly, it is an object of this invention to set forth a planet gear assembly comprising a frame; planet gears; journal pins for rotatably mounting said planet gears to said frame; and washer engaged with said frame to retain said pins in place relative to said frame. Said pins have means for (a) engaging said washer, and (b) preventing rotation of said pin relative to said frame.

Further objects of this invention, as well as the novel features thereof, will become more apparent by reference to the following description taken in conjunction with the accompanying figures, in which:

FIG. 1 is an axial cross-section of an embodiment of the novel planet gear frame assembly according to the invention;

FIG. 2 depicts an end view of the pin of FIG. 1, with a portion of the periphery of the retaining washer shown only in phantom;

FIG. 3 is a reduced, perspective view of the frame of FIG. 1;

FIG. 4 is an illustration, like that of FIG. 1, albeit of just a portion of a planet gear frame assembly, according to the invention, the same showing how the FIG. 1 embodiment can be altered for a differing gear ratio; and FIG. 5 shows an end view of an alternate pin.

As shown in FIGS. 1, 3 and 4, the novel planet gear frame assembly 10 comprises a frame 12 in which to mount planet gears 14 (only one of which is shown). The frame 12 comprises a shaft 16 and an integral housing 18. The housing 18 has a pair of parallel walls 20 and 22 which are joined thereacross at three equidistant locations by webs 24 (only one is shown). Also, at three equidistant locations, the housing 18 has paired apertures 26; there are three of such pairs, but one pair is not visible. Apertures 26 of each pair, in the walls 20 and 22, are directly aligned with each other, in parallel with the axis of the shaft 16.

Apertures 26 receive pins 28, and the latter, in turn, mount planet gear bearings 30 and planet gears 14. Thin bearing spacers 32 are interposed between the bearings 30 and the walls 20 and 22.

The planet gears 14 are in meshed engagement with a sun gear 34 only a fragment of which is shown, as well as with a ring gear 36. Retaining washers 38 and 38a are set against the walls 20 and 22, respectively, to retain the pins 28 in place and to prevent rotation of the pins in the frame 12. Bearings 40, for rotatably journaling the frame 12 are set against the washers 38 and 38a on the shaft 16 and the stub 16a. Washers 38 and 38a are identical and interchangeable. They are only assigned different numbers for clarity in describing their functions with respect to the pins 28 in the illustrated embodiment.

In accordance with the invention, each pin 28 has prominent axial lands 42 and 44 formed on at least one end which interface with the washers 38. As shown in FIG. 1, land 42 nests against the periphery of the retaining washer 38. Due to this engagement thereof with the washer 38, the pin 28 is restricted against rotation.

Now, it will be appreciated that assembly 10 has a given gear ratio. To form a planet gear frame assembly with a differing gear ratio, according to the invention, most of the same components and parts as are in the assembly 10 can be employed. FIG. 4 depicts a planet gear frame assembly 10a, having a differing gear ratio, in which such same components and parts are used.

The planet gear frame assembly 10a of FIG. 4 requires a different frame 12a, different planet gears 14a, and a different ring gear 36a. However, all else remains the same as in assembly 10 of FIG. 1. Here, however, the pins 28 are rotated one hundred and eighty degrees (180°) to set the land 44 against the washer 38. This is necessary because apertures 26 have a greater radial separation in assembly 10a than in assembly 10 due to the larger frame 12a, planet gears 14a, and ring gear 36a. Since land 44 of pin 28 is offset from the pin centerline, unlike land 42, it engages washer 38 in spite of the greater spacing between pin 28 and stub shaft 16a. The selfsame pins 28 and washers 38 (and 38a) are used with the larger planet gears 14a. Only the radial orientation of the pins is changed in order to function in both assemblies.

The frame 12a has a greater diameter than that of frame 12, and apertures 26 therein are formed more radially outward. However, the shaft 16 and stub 16a are of the same dimension to accommodate the bearings 40 and the aforesaid washers 38 and 38a.

Land 42 has its intermediate portion aligned with the axial centerline 46 of the pins 28 while land 44 is offset from the centerline 46, and it is by this novel expedient that the pins 28 are usable in both assemblies 10 and 10a. Because of the different offset distances from the pin centerline, the pin, properly radially oriented, can be used in both frames 12 and 12a, with their differing aperture 26 spacings, and still properly engaged with washers 38.

FIG. 5 shows an end of the alternate pin 28a in which the lands 42a and 44a are arcuately formed, simply to effect a more mated nesting thereof with the periphery of the washer 38.

According to our invention, it is necessary, in order to form planet gear assemblies of differing gear ratios, to stock only differing planet gears, ring gears, and frame 14 and 14a, 36 and 36a, 12 and 12a, respectively. All other components and parts are common.

For the sake of brevity, we have described pins which enable the use of common parts in two different size assemblies. By simply increasing the number of lands on each pin, each offset by a different distance from the pin centerline, it would be possible to apply this invention to three or more different size assemblies. Lands could also be provided, if desired, on both ends of the pins.

While we have described our invention in connection with a specific embodiment thereof it is to be clearly understood that this is done only by way of example, and not as a limitation to the scope of our invention as set forth in the objects thereof and in the appended claims.

We claim:

1. A planet gear frame assembly, comprising:

a frame;

at least one planet gear;

at least one pin, upon which each said planet gear is journalled, engaged with said frame;

means for retaining said pin in place relative to said frame comprising a washer engaged with said frame; and a plurality of axially extending lands, all formed at different distances extending radially from the pin axial centerline, on at least one end of said pin for engaging said washer and thereby preventing rotation of said pin relative to said frame; wherein said washer is engaged with only one of the lands during operation of the assembly.

* * * * *